（12) United States Patent
Frovel et al.

(10) Patent No.: US 11,794,909 B2
(45) Date of Patent: Oct. 24, 2023

(54) SYSTEM AND METHOD FOR DETECTING ICE FORMATION ON A BODY

(71) Applicant: INSTITUTO NACIONAL DE TECNICA AEROESPACIAL, Torrejon de Ardoz (ES)

(72) Inventors: Malte Frovel, Paracuellos de Jarama (ES); Ana Belen Fernandez-Medina Maeso, Valdepenas (ES); Julio Mora, Madrid (ES); Alina Aguero, Madrid (ES); Suthyvann Sor Mendi, Meco (ES); Raquel Lopez Heredero, Madrid (ES); Adelaida Garcia-Magarino Garcia, Madrid (ES); Miguel Gonzalez Del Val, Madrid (ES)

(73) Assignee: INSTITUTO NACIONAL DE TECNICA AEROESPACIAL, Torrejon de Ardoz (ES)

( * ) Notice: Subject to any disclaimer, the term of this patent is extended or adjusted under 35 U.S.C. 154(b) by 442 days.

(21) Appl. No.: 17/274,269

(22) PCT Filed: Sep. 10, 2019

(86) PCT No.: PCT/EP2019/074091
§ 371 (c)(1),
(2) Date: Mar. 8, 2021

(87) PCT Pub. No.: WO2020/053202
PCT Pub. Date: Mar. 19, 2020

(65) Prior Publication Data
US 2021/0316869 A1 Oct. 14, 2021

(30) Foreign Application Priority Data
Sep. 10, 2018 (EP) .................................... 18382649

(51) Int. Cl.
*B64D 15/20* (2006.01)
*F03D 80/40* (2016.01)
(Continued)

(52) U.S. Cl.
CPC ............. *B64D 15/20* (2013.01); *F03D 80/40* (2016.05); *G01D 5/35316* (2013.01);
(Continued)

(58) Field of Classification Search
CPC .... B64D 15/20; F03D 80/40; G01D 5/35316; G01K 11/3206; G08B 19/02; H02G 7/16
See application file for complete search history.

(56) References Cited

U.S. PATENT DOCUMENTS 2,766,619 A 10/1956 Myron
4,210,021 A 7/1980 Vykhodtsev
(Continued)

FOREIGN PATENT DOCUMENTS

EP 1524509 A1 4/2005

*Primary Examiner* — Ojiako K Nwugo
(74) *Attorney, Agent, or Firm* — Hayes Soloway PC (57) ABSTRACT

The present invention relates, but without limitation, to a system and method for detecting the formation of ice on a surface of a body (1) on which an air stream impinges. Said system comprises: a first and a second temperature detectors (2, 5) with different thermal inertia; and an electro-optic module (10) connected to both detectors (2, 5). Thus, by calculating the different responses of the detectors (2, 5) it is possible to detect the ice formation on a body (1), and more advantageously, the almost instantaneously freezing of supercooled water on a body (1). The present invention can be applied to aircrafts, wind turbines or to electrical power transmission lines.

17 Claims, 4 Drawing Sheets

(51) Int. Cl.
*G01D 5/353* (2006.01)
*G01K 11/3206* (2021.01)
*G08B 19/02* (2006.01)
*H02G 7/16* (2006.01)

(52) U.S. Cl.
CPC .......... *G01K 11/3206* (2013.01); *G08B 19/02* (2013.01); *H02G 7/16* (2013.01)

(56) References Cited

U.S. PATENT DOCUMENTS

| | | | |
|---|---|---|---|
| 4,882,574 A | 11/1989 | Khurgin | |
| 8,172,180 B2 | 5/2012 | Press | |
| 10,260,789 B2 * | 4/2019 | Alshourbagy | ............ F25C 5/06 |
| 2002/0172446 A1 | 11/2002 | Fernald et al. | |
| 2006/0146909 A1 | 7/2006 | Morse et al. | |
| 2006/0289663 A1 * | 12/2006 | Smith | ................ B60H 1/00278 |
| | | | 237/12.3 B |
| 2009/0279381 A1 * | 11/2009 | Koopmans | ............ B01F 33/406 |
| | | | 366/106 |
| 2012/0061482 A1 * | 3/2012 | Stothers | ................ B64D 15/20 |
| | | | 237/2 R |
| 2016/0298893 A1 * | 10/2016 | Knatt | ........................ F25C 5/10 |
| 2017/0361680 A1 * | 12/2017 | Uehara | .............. B60H 1/00764 |
| 2018/0215476 A1 * | 8/2018 | Chee | ........................ C09D 7/65 |
| 2018/0310978 A1 * | 11/2018 | Avitall | ................... A61B 5/283 |
| 2019/0202568 A1 * | 7/2019 | Borup | ................... B64C 39/024 |

* cited by examiner

SYSTEM AND METHOD FOR DETECTING ICE FORMATION ON A BODY

CROSS-REFERENCE TO RELATED APPLICATIONS AND PRIORITY

This patent application claims priority from PCT Patent Application No. PCT/EP2019/074091 filed Sep. 10, 2019, which claims priority from European Patent Application No. 18382649.4 filed Sep. 10, 2018. Each of these patent applications are herein incorporated by reference in its/their entirety.

FIELD OF THE INVENTION

The present invention relates generally to a system and a method for monitoring the ice formation based on temperature sensors.

BACKGROUND OF THE INVENTION

The formation and accretion of unwanted ice around certain solids or bodies is a trouble in many sectors. This is the case, for example, in the aeronautical sector where the formation of ice on surfaces such as the wings, fuselage or aircraft engines causes a loss of the aerodynamic performances or causes damage to mobile structures. Under these conditions, the aircraft loses its lift and this may cause the pilot to lose control of the aircraft. To deal with this problem, aircrafts have internal heating circuits or anti-icing systems and devices. However, if the detection of ice formation is not fast and effective, the cited counter measures lose effectiveness. Said problem is accentuated, at the height ranges where aircrafts typically fly and where the presence of supercooled water is frequent, that is, liquid water below its freezing temperature.

However, this field is not the only one which has to deal with this problem. Other technical applications, such as wind turbines and transmission lines, also suffer the effects of ice formation and accretion.

In the case of transmission lines, in cold regions, the formation of ice on the cables of the electric transport lines drastically increases the weight that the electrical towers have to support. In these situations, it is common to stop the power supply in said electrical power transmission lines. In the event of wind turbines, aerodynamic forces are altered by the presence of ice, and the dynamic behaviour of the rotating blades undergoes a substantial change as well.

Additionally, in the three examples cited, the proposed sensors are immune to electromagnetic interferences (EMI) and do not affect either other electric systems around them, so the present solution avoids any constraint related to EMI in both applications.

The state of the art known to the applicant includes patents related to the measurement of ice formation by different devices, technologies, systems and methods, which will be described below.

European patent application EP1524509 A1 discloses a device and a method for detecting the variation of temperature along an optic fibre section. Said optical fibre can be placed along the front profile of an aircraft wing to detect the formation of ice on a particular point of the wing based on a single temperature measurement.

In U.S. Pat. No. 4,210,021A, a device and method for detecting ice on objects immersed in an air stream is disclosed. Said invention is based on the use of two surfaces: a surface where drops of supercooled water can precipitate and a second surface protected from moisture and from the precipitation of drops of supercooled water. By means of temperature sensors, of the thermistor type, the difference between the temperature of each surface is measured to determine if said temperature difference is significant to determine the presence of ice.

Therefore, it is essential to have a system for detecting the formation and accretion of ice that is reliable and fast, in addition to using a technology that does not interfere electromagnetically with the environment and are not interfered by it. Thus, by means of the present invention, the solutions offered by the state of the art are overcome by proposing a system based on at least two detectors with different thermal inertias, which allows to accurately detect the formation of ice on a body, and particularly the formation of ice from the freezing of supercooled water.

BRIEF DESCRIPTION OF THE INVENTION

The object of the present invention relates, without limitation, to a system for detecting ice formation on a body comprising, at least:
  a first detector comprising a first temperature sensor;
  a second detector comprising a second temperature sensor; and
  an electro-optic module configured to generate input measuring signals into the first and second detectors, to receive measuring signals from the first and second detectors and process and transmit measurements.
Advantageously, the system is characterized in that:
  the first detector comprises a first housing surrounding the first temperature sensor defining a first detection volume formed between the first temperature sensor and the first housing the first detection volume being filled by a fluid, such as air;
  the second detector comprises a second housing surrounding the second temperature sensor defining a second detection volume formed between the second temperature sensor and the second housing, the second detection volume being filled by a fluid, such as air.
More advantageously, said second detection volume is greater than the first detection volume.

Due to this volume difference, the first and second detectors have different thermal inertia, such that they have different responses to temperature gradients. These different responses to temperature gradients are important to determine the formation of ice on a body, as will be detailed later. The first and second temperature sensors may include, but are not limited to, optical sensors such as optic fibre sensors, electrical sensor such as thermistors or thermocouples.

The first temperature sensor and the second temperature sensor are suitable for detecting the small peaks of latent heat which are emitted by the supercooled water upon freezing. This latent heat is sensed by both sensors, but with different intensity, due to the difference between the first detection volume and the second detection volume. The difference between the outputs of the first and second sensor will provide an indication that ice is forming in the surface of the part to be analyzed.

In a preferred embodiment of the present invention, the at least one first detector is a first optic fibre detector, wherein:
  the first optic fibre detector comprises a first optical fibre core;
  the first temperature sensor is arranged into the first optical fibre core, the first temperature sensor being a first optical sensor;

the first optic fibre detector comprises a first glass cladding having a first outer diameter, the first glass cladding being arranged around the first optical fibre core in such a way that a first portion of the first glass cladding surrounds the first optical sensor;

the first housing is a first sealed capillary having a second inner diameter, the first sealed capillary being disposed at least around the first portion of the first glass cladding, wherein the second inner diameter is greater than the first outer diameter, and the first detection volume corresponds to the volume between the first outer diameter and the second inner diameter.

In addition, the at least one second detector comprises a second optic fibre detector, wherein:

the second optic fibre detector comprises a second optical fibre core;

the second temperature sensor is arranged into the second optical fibre core, the second temperature sensor being a second optical sensor;

the second optic fibre detector comprises a second glass cladding having a third outer diameter, the second glass cladding being arranged around the second optical fibre core;

the second housing is a second sealed capillary, having this second sealed capillary a fourth inner diameter, the second sealed capillary being disposed around the second glass cladding, the fourth inner diameter being greater than the third outer diameter, and the second detection volume corresponds to the volume between the third outer diameter and the fourth inner diameter.

More advantageously, the difference between the fourth inner diameter and the third outer diameter is greater than the difference between the second inner diameter and the first outer diameter. The electro-optic module is configured to generate light inputs and to receive optical measurements from the first and second optic fibre detectors and also configured to process and transmit the optical measurements.

In yet another embodiment of the present invention, the first and/or second optic fibre sensors comprise a fibre Bragg grating or a long-period fibre grating.

Thus, the first optic fibre detector is able to detect temperature variations faster than the second optic fibre detector. Therefore, when an optical signal generated by the electro-optic module reaches the first and second optical sensors, these optical sensors will reflect part of said optical signal as a function of the temperature of said first and second optical sensors. In this way, the filtered optical signals arriving at the electro-optic module will be different as long as the temperature of said first and second optical sensors is different. In this way, by analyzing said filtered optical signals, the electro-optic module is able to calculate the temperature at the position where the first and second optical sensors are located.

In yet another embodiment of the present invention, the first outer diameter and the third outer diameter are comprised between 0.006 and 0.1265 mm. Moreover, the second inner diameter is comprised between 0.13 and 0.25 mm. More advantageously, the fourth inner diameter is between 0.5 and 1.0 mm.

In yet another embodiment of the present invention, the first capillary of the at least one first optic fibre detector comprises a fifth outer diameter comprised between 0.25 and 0.5 mm and wherein the second capillary sealed of the at least one second optic fibre detector comprises a sixth outer diameter comprised between 2 and 3 mm.

In yet another embodiment of the present invention, the first and second optical sensors have a length comprised between 2 and 20 mm.

In yet another embodiment of the present invention, the at least one first optic fibre detector comprises:

a first protective coating around a second portion of the first glass cladding, in such a way that the second portion of the first glass cladding is coated by the first protective coating and a third portion of the first glass cladding is not coated, the first portion being substantially in the middle of the third portion and the first sealed capillary being around the third portion, a connecting element between the first protective coating and the first sealed capillary; and wherein the at least one second optic fibre detector comprises a second protective coating around the second glass cladding.

In yet another embodiment of the present invention, the third portion extends along a length comprised between 20 and 50 mm, and the first sealed capillary extends along a length comprised between 30 and 60 mm.

In yet another embodiment of the present invention, the connecting element between the first protective coating and the first sealed capillary of the at least one first optic fibre detector comprises a probe or an adhesive, or a combination of both.

In yet another embodiment of the present invention, the first sealed capillary comprises a metallic material and the second sealed capillary comprises glass or a polymer.

A metallic first sealed capillary increases the reaction speed of the first detector, while a polymeric second sealed capillary decreases the reaction speed of the second detector, thus increasing the difference in the reaction time between the sensors comprised in both detectors.

In yet another embodiment of the present invention, the system further comprises an aerodynamic surface with a leading edge intended to receive an air stream and an volume downstream the leading edge, wherein the first detector is located in contact with the leading edge of the aerodynamic surface and the second detector is located in the volume, downstream the first detector.

With that configuration, the system may be implemented on different examples of aerodynamic surfaces, such as an aerofoil or a sensor probe. In different embodiments, the first detector may be located at one side of the leading edge or the other, depending on the use of the device.

In yet another embodiment of the present invention, the first detector is arranged covering at least a portion of the leading edge and comprises a plurality of sensors, at least two sensors being located at different chord line values of the aerodynamic surface.

In this embodiment, the plurality of sensors may measure the ice accretion in different zones of the leading edge, thus being able to differentiate the effects of different types of ice.

A further object of the present invention is a method for detecting the ice formation on a body by a system according to any of the embodiments described herein. The method preferably comprises the following steps:

generating an input signal into the first and second detectors;

generating an output signal by the first and second temperature sensors;

receiving the output signal in the electro-optic module;

processing the received output signal and calculating a temperature difference;

generating a warning signal if the temperature difference is greater than a predetermined temperature threshold.

In yet another embodiment of the present invention, the method comprises the following steps:

- injecting a light beam in each of the first and second optic fibre detectors;
- respectively filtering the light beams in the at least first and second optical sensors as a function of the temperature of the respective optical sensor;
- receiving the respective filtered light beams in the electro-optic module;
- processing the received light beams and calculating a temperature difference;
- generating a warning signal if the temperature difference is greater than a predetermined temperature threshold.

In yet another embodiment of the present invention, the method for detecting the ice formation requires prior to the step of injecting a light beam, the method further comprising the steps of:

- providing a body where ice formation is to be detected, the body comprising an outer surface intended to receive an air stream and a volume downstream this outer surface arranged to be protected from the air stream;
- placing the at least one first optic fibre detector in contact with to the outer surface of the body and placing the at least one second optic fibre detector in the volume behind the outer surface.

In yet another embodiment of the present invention, the step of processing the receiving output signal further comprises calculating the derivative of the temperature with respect to time, and the step of generating a warning signal comprises generating one of a predetermined group of warning signals, depending on the result of the derivative of the temperature with respect to time.

In this embodiment, the method is able to use the derivative of the temperature with respect to time to differentiate between different ice accretions, types of ice and thickness of the ice layer.

A further object of the present invention is the use of the system according to any of the embodiments described herein, for detecting ice in any one of the following bodies: a part of an aircraft or an electrical power transmission line.

DESCRIPTION OF THE DRAWINGS

The characteristics and advantages of this invention will be more apparent from the following detailed description, when read in conjunction with the accompanying drawings, in which.

NUMERICAL REFERENCES USED IN THE DRAWINGS

In order to provide a better understanding of the technical features of the invention, the referred FIGS. 1-5 are accompanied of a series of numeral references which, with illustrative and non-limiting character, are hereby represented:

| (1) | Wing |
| --- | --- |
| (2) | First detector |
| (3) | First temperature sensor |
| (4) | First housing |
| (5) | Second detector |
| (6) | Second temperature sensor |
| (7) | Second housing |
| (8) | First optic fibre detector |
| (9) | Second optic fibre detector |
| (10) | Electro-optic module |
| (11) | First optical fibre core |
| (12) | First optical sensor |
| (13) | First glass cladding |
| (14) | First protective coating |
| (15) | First sealed capillary |
| (16) | Closure cap |
| (17) | Connecting element |
| (18) | Second optical fibre core |
| (19) | Second optical sensor |
| (20) | Second glass cladding |
| (21) | Second protective coating |
| (22) | Second capillary sealed |
| (23) | Leading edge of the body |
| (24) | Inner volume behind the leading edge |
| (25) | Sensor probe |

DETAILED DESCRIPTION OF THE INVENTION

In the following description, for purposes of explanation and not limitation, details are set forth in order to provide a thorough understanding of the present invention. However, it will be apparent to those skilled in the art that the present invention may be practiced in other embodiments that depart from these details and descriptions without departing from the spirit and scope of the invention. Certain embodiments will be described below with reference to the drawings wherein illustrative features are denoted by reference numerals.

Figure 1:
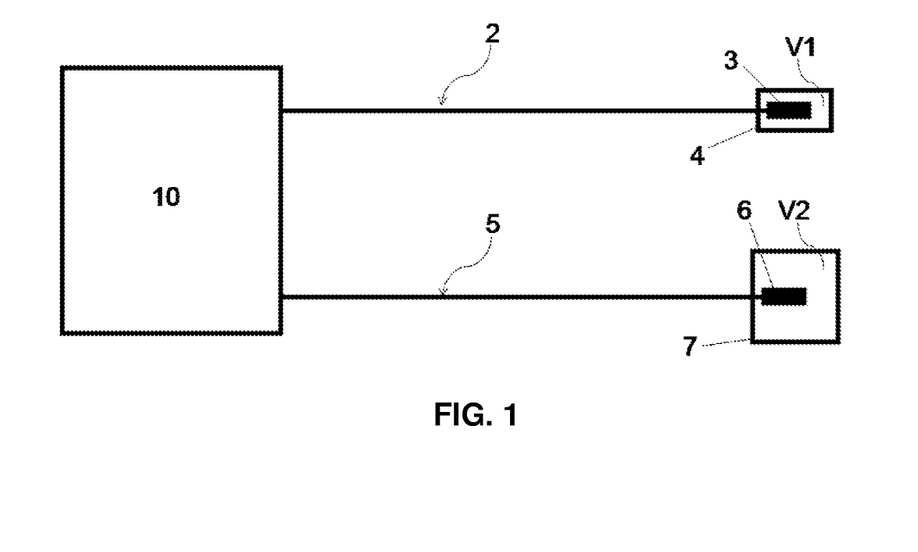
FIG. 1 shows, according to a preferred embodiment of the invention, a schematic view of the system for detecting ice formation on a body.

As described in previous sections and as represented in the figures, a main object of the invention is related to a system for detecting the ice formation and accretion on a body 1, preferably suitable for determining the almost instantaneous freezing of drops of supercooled water when destabilized by, for example, impacting into the body 1. Generally, as is shown in FIG. 1, said ice formation and accretion detection system comprises:

- a first detector 2 in turn comprising a first temperature sensor 3 and a first housing 4 surrounding the first temperature sensor 3;

a second detector 5 in turn comprising a second temperature sensor 6 and a second housing 7 surrounding the second temperature sensor 6;

an electro-optic module 10 configured to generate inputs into the first and second detectors 2, 5 and to receive measurements from the first and second detectors 2, 5 and also configured to process and transmit the measurements.

A first detection volume V1 is formed between the first temperature sensor 3 and the first housing 4, and a second detection volume V2, which is larger than volume V1, is formed between the second temperature sensor 6 and the second housing 7.

Thus, the first and second detectors 2, 5 have different thermal inertias and hence they have different responses to temperature gradients. These different responses to temperature gradients are important to determine the formation of ice on a body 1, as will be detailed later. The first and second temperature sensors 3, 6 may include, but are not limited to, optical sensors such as optic fibre sensors, electrical sensor such as thermistors or thermocouples.

Figure 2:
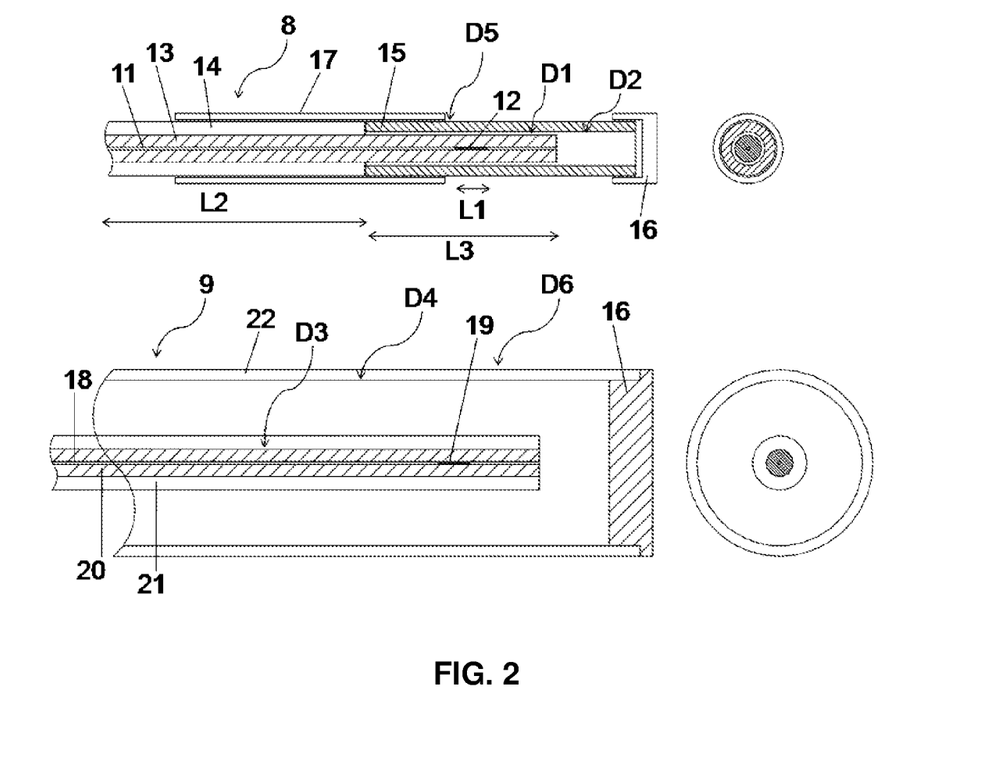
FIG. 2 shows, according to a preferred embodiment of the invention, a cross sectional view of the first and second optic fibre detectors.

FIG. 2 illustrates a more detailed view of an ice formation and accretion detection system according to the invention. This system comprises:

a first and second optic fibre detectors 8, 9, each one being adapted to perform optical temperature measurements an electro-optic module 10 connected to the first and second optic fibre detectors 8, 9.

The electro-optic module 10 is configured in such a way that it generates an optical signal through the first and second optic fibre detectors 8, 9 and receives said optical signals filtered by the optic fibre detectors 8, 9 to subsequently analyze and transmit measurements made on said optical signals.

The first optic fibre detector 8 comprises:

a first optical fibre core 11 comprising a first optical sensor 12 sensitive to temperature variation;

a first glass cladding 13 with a first outer diameter D1 that surrounds the first optical fibre core 11, wherein said first glass cladding 13 protects the first optical fibre core 11 and allows the reflection of the light inside said first optical fibre core 11;

a first protective coating 14 that surrounds a portion of the first glass cladding 13, avoiding damage to the first glass cladding 13.

Then, three portions of the first glass cladding 13 are defined in order to continue with the definition of the first optical fibre detector 8. Thus, the first glass cladding 13 comprises:

a first portion L1 located over the first optical sensor 12;

a second portion L2 where the first protective coating 14 surrounds the first glass cladding 13; and a third portion L3 wherein the first glass cladding 13 is not surrounded by the first protective coating 14, so that the first portion L1 is disposed substantially in the middle of said third portion L3.

In addition, the first detector 8 comprises a first sealed capillary 15 comprising at least one closure cap 16 and a connecting element 17 between the first protective coating 14 and the first sealed capillary 15. The first sealed capillary 15 is disposed around the first glass cladding 13 at least along the first portion L1 of the first glass cladding 13. Furthermore, said first sealed capillary 15, has a second inner diameter D2 greater than the first outer diameter D1. In some embodiments, the connecting element 17 may comprise a probe, an adhesive or a combination of both.

The second optical fibre detector 9 comprises in turn:

a second optical fibre core 18 comprising a second optical sensor 19 inside it, this second optical sensor 19 being sensitive to temperature variation;

a second glass cladding 20 with a third outer diameter D3 that surrounds the second optical fibre core 18, wherein said second glass cladding 20 protects the second optical fibre core 18 and allows the reflection of the light inside said second optical fibre core 18;

a second protective coating 21 surrounding the second glass cladding 20, avoiding damage to said second glass cladding 20;

a second sealed capillary 22 comprising at least one closure cap 16, wherein said second sealed capillary 22 is arranged around the second glass cladding 20, wherein said second capillary 22 has a fourth inner diameter D4 greater than third outer diameter D3 and wherein the difference between the fourth inner diameter D4 with the third outer diameter D3 is greater than the difference between the second inner diameter D2 with the first outer diameter D1.

By means of the described configuration, the thermal inertia of the first optic fibre detector 8 is lower than the thermal inertia of the second optic fibre detector 9. Thus, the first optic fibre detector 8 is able to detect temperature variations faster than the second optic fibre detector 9. Therefore, when an optical signal generated by the electro-optic module 10 reaches the first and second optical sensors 12, 19, these optical sensors 12, 19 will reflect part of said optical signal as a function of the temperature of said first and second optical sensors 12, 19. In this way, the filtered optical signals arriving at the electro-optic module 10 will be different as long as the temperature of said first and second optical sensors 12, 19 is different. In this way, by analyzing said filtered optical signals, the electro-optic module 10 is able to calculate the temperature at the position where the first and second optical sensors 12, 19 are located.

To obtain the optimal operation of said ice formation and accretion detection system, where a first detector 8 is able to detect the temperature variations faster than the second detector 9, the relation between the dimensions of the different elements of each detector 8, 9 is important. Therefore, various preferred embodiments of the invention related to the dimensions of these various elements of the system are described below.

On the one hand, the first and/or the second optical fibre cores 11, 18 comprise an external diameter between 6 and 10 micrometers. In another preferred embodiment of the invention, the first outer diameter D1 and the third outer diameter D3 are comprised between 0.006 and 0.125 mm. Even more preferably, the second inner diameter D2 is comprised between 0.13 and 0.25 mm. In another preferred embodiment, the fourth inner diameter D4 is comprised between 0.5 and 1.0 mm. Likewise, the first capillary 15 comprises a fifth outer diameter D5 comprised between 0.25 and 0.5 mm and the second capillary 22 comprises a sixth outer diameter D6 comprised between 2 and 3 mm.

On the other hand, the first and second optical sensors 12, 19 have a length comprised between 2 and 20 mm. In this way, the first portion L1 of the first glass cladding 13 comprises a length between 2 and 20 mm. Also, the third portion L3 of the first glass cladding 13 comprises a length between 20 and 50 mm. Thus, the first sealed capillary 15 is extended along a length comprised between 30 and 60 mm.

In another preferred embodiment of the invention, the first protective coating 14 wraps the first glass cladding 13 along the second portion L2 and along the third portion L3.

In another preferred embodiment of the invention, said first and/or second optical sensors 12, 19 are Fibre Bragg Gratings, also called FBG or long period fibre gratings, also called LPG.

Another relevant aspect of the present invention is related to the materials used in some elements. Thus, the first and/or the second sealed capillary 15, 22 comprise one of the following types of materials: metal, glass or polymer. Even more preferably, said first and second sealed capillaries 15, 22 are made of a thermally conductive material. In this way, the first and second sensors 12, 19 better capture the temperature of the environment.

In order to explain the functionality of one embodiment of the invention, another object of the invention is disclosed below, which relates to a method for detecting the ice formation and accretion on a body 1. Said method includes the use of the system for detecting the formation of ice in a body 1, as well as performing the following steps:

- injecting a light beam in each of the first and second optic fibre detectors 8, 9;
- respectively filtering the light beams in the at least first and second optical sensors 12, 19 as a function of the temperature of the respective optical sensor 12, 19;
- receiving the respective filtered light beams in the electro-optic module 10;
- processing the received light beams and calculating a temperature difference and the derivative of the temperature with respect to time;
- generating one of a predetermined group of warning signals depending on the result of the temperature difference and the result of the derivative of the temperature with respect to time.

As a result of this method, it is possible to detect temperature variations in the regions where the optical sensors 12, 19 are located through the optic fibre detectors 8, 9 based on optical magnitudes, so that they do not interfere electromagnetically with other devices that can be placed around them. This is especially relevant in sectors such as aeronautics, wind turbines or power distribution lines.

The calculation of the derivative of the temperature with respect to time allows the estimation of the behaviour of the ice layer, and more particularly:

- the duration of the ice accretion;
- the quantity of ice accretion, estimating with the above mentioned ice thickness; and
- the exact moment when the ice accretion stops.

In fact, this last feature is very important for the pilot, since they need to escape from the icing cloud when severe icing starts. The exact information about the ending of the ice accretion gives them the information so that they can stop escaping from the icing condition. A measure for the accretion time is the time when the sensor couple shows an increment in temperature with respect to the temperature before the ice accretion. A measure for the ice thickness is also the decrement of the temperature signal that is becoming weaker because of the ice layer growth.

Figure 3A:
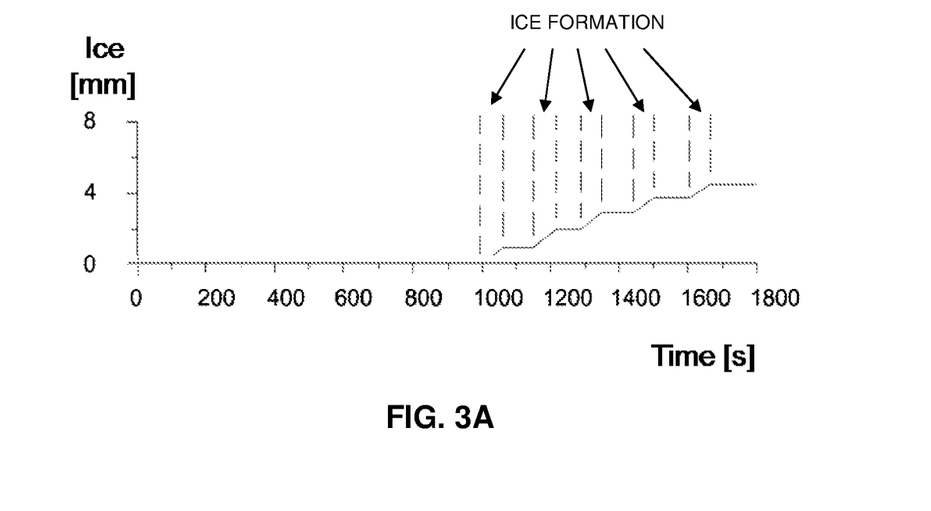
FIG. 3A shows the increase of the thickness, as a function of time, of the ice layer formed on the body where the ice detection system of the invention is arranged, according to a preferred embodiment of the invention.
Figure 3B:
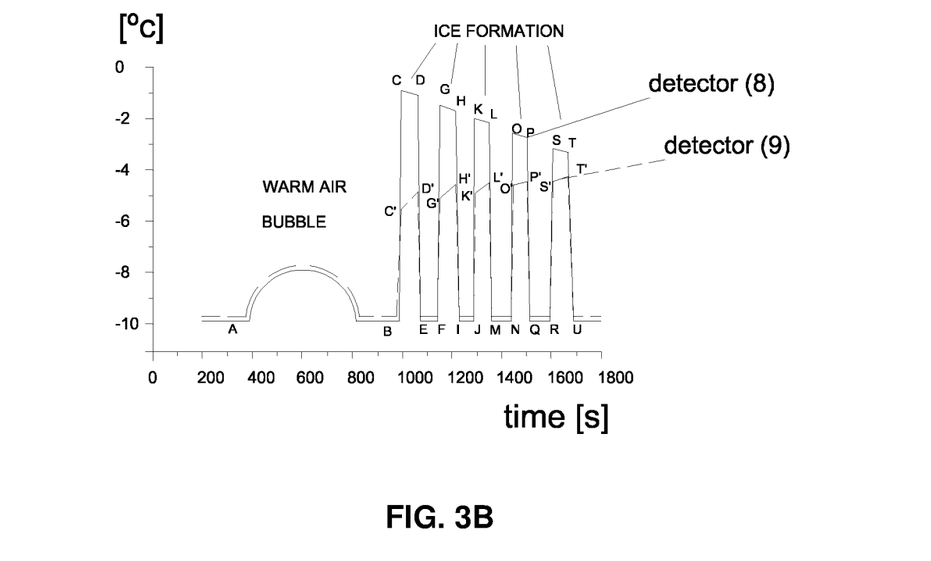
FIG. 3B shows the temperature simultaneous response of the first and second optic fibre detectors when the body cross through a warm air bubble and when supercooled water is deposited on said body, according to a preferred embodiment of the invention.
Figure 3C:
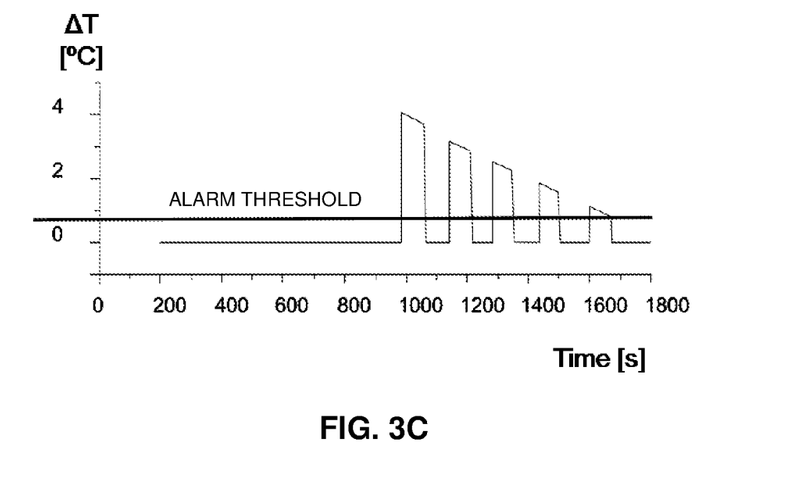
FIG. 3C shows the temperature difference between the first and second optic fibre detectors in different conditions, according to a preferred embodiment of the invention.

As shown in FIGS. 3A, 3B and 3C, by locating the optic fibre detectors 8, 9 in the body 1 where the ice formation is to be detected and due to the different thermal inertias of the first and second detectors 8, 9, this method is able to detect the ice formation due to the freezing of drops of supercooled water. Under certain physical and chemical conditions, the water can be liquid at temperatures substantially below its theoretical temperature of pure water phase change, around 0° C. at atmospheric pressure. Under these conditions, it is said that the water is supercooled. In these conditions, a disturbance of said drop, such as the impact of said supercooled drop of water on a body 1, causes its almost instantaneous freezing, in the order of milliseconds, as well as an exothermic peak due to the release of enthalpy. In this way, the ice formed is around the freezing temperature of the water, around 0° C. at atmospheric pressure.

In FIGS. 3A to 3C, the relationship between the temperatures detected by the first and second optic fibre detectors 8, 9, in which the invention has been exposed to five periods of ice formation on a body 1, is shown. For this purpose, the system has been located as described above in the body 1 where the ice formation has to be detected. Thus, when a drop of water supercooled at a substantially lower temperature than its freezing temperature, in an air stream at the same temperature as the water drop, hits the surface of the body 1 where the first optic fibre detector 8 is located, said supercooled water droplet freezes almost instantaneously reaches a temperature substantially close to its freezing temperature. In this way, the first optical fibre detector 8 detects quickly said temperature increase, as shown in the segments BC, FG, JK, NO or RS in continuous line of FIG. 3B, while the second optic fibre detector 9 due to its greater thermal inertia, due to its protected location from the air stream and due that the energy released by the water drop is substantially lower than the energy contained in the air stream, the second optic fibre detector 9 detects a lower temperature increase, as shown in the segments in discontinuous line BC', FG', JK', NO' or RS' of FIG. 3B. In this way, when the electro-optic module 10 measures a temperature difference between the first and second optic fibre detectors 8, 9, as shown in FIG. 3C, it sends an alarm signal of the start of the ice formation on the body 1. Subsequently, during the accretion of ice on the body 1, the first detector 8 slowly decreases the temperature detected due to the increase of the ice layer on the body 1, as shown in the respective segments CD, GH, KL, OP and ST of FIG. 3C. During said accretion steps of ice on the body 1, the second optic fibre detector 9 slowly increases the temperature it senses due to the increase of the ice layer on the body 1, as shown in the respective segments CD', GH', KL', OP' and ST' of FIG. 3B. Once supercooled water stops being deposited and the ice layer stops growing on the body 1, this layer of ice, depending on its thickness, quickly acquires a temperature substantially lower than its freezing point, because the environment temperature is substantially lower than the water freezing temperature. In this situation, both detectors 8, 9 respond substantially in the same way, performing the same simultaneous temperature measurements, as shown in segments EF, IJ, MN and QR of FIGS. 3B and 3C.

In the case where the body 1, being at an initial temperature substantially lower than the freezing point of the water is exposed to a warm temporary air bubble, hotter than said initial temperature, the first and second optic fibre detectors 8, 9 measure almost simultaneously the same temperature increase, as shown in FIG. 3B. This is because the warm air bubbles contain more thermal energy and transfer this energy faster to the body 1. In this way, false alarms when the body 1 is traversed by warm air bubbles are avoided.

Even if the detection of ice formation from supercooled water is the main objective of the present invention, the system is prepared to detect other phase changes of water and/or other substances. For this, it would be evident that a person skilled in the art would adjust the volume difference between the first and second detectors 2, 5, their position with respect to the body 1 or even employ some temperature sensor technology different from that based on optical fibre.

A third object of the invention is related to the use of the system for detecting the ice formation and accretion on a body 1 in the aeronautical sector using the method explained. In a preferred embodiment of the invention, the system is installed on a part of an aircraft chosen from among the following ones: the fuselage, the wings and/or at any entrance to an engine of the aircraft.

Figure 4:
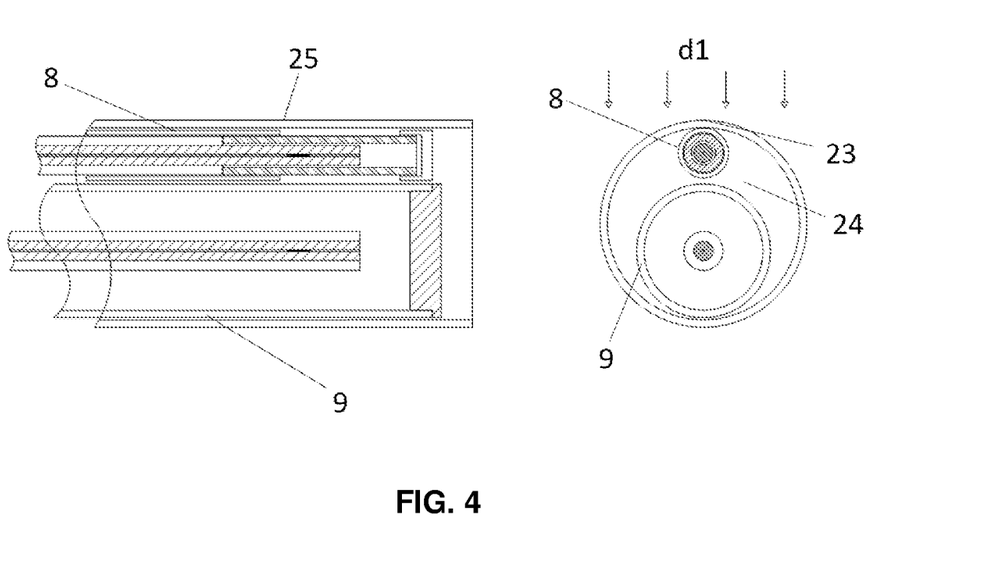
FIG. 4 shows a cross sectional view of an embodiment of the invention where the system is housed in a tubular structure that can be integrated in the fuselage or wings of an aircraft, positioned in the airstream, or on top of power-lines.

FIG. 4 shows a preferred embodiment of the use of the present system in a circular sensor probe 25 where ice formation is to be detected. This probe 25 has a leading edge 23 intended to receive an air stream in a direction d1 and an inner volume 24.

In this embodiment, both first and second detectors 8, 9 are located inside the volume 24. The first detector 8 is located in contact with the leading edge 23 of the probe 25 and the second detector 9 is located downstream the first detector 8.

By means of this embedded configuration of the optic fibre detectors 8, 9, the detection system can be applied to different bodies without the need to modify them in order to introduce the optic fibre detectors 8, 9.

In other embodiments, even more probes are installed along the aircraft if needed.

Figure 5:
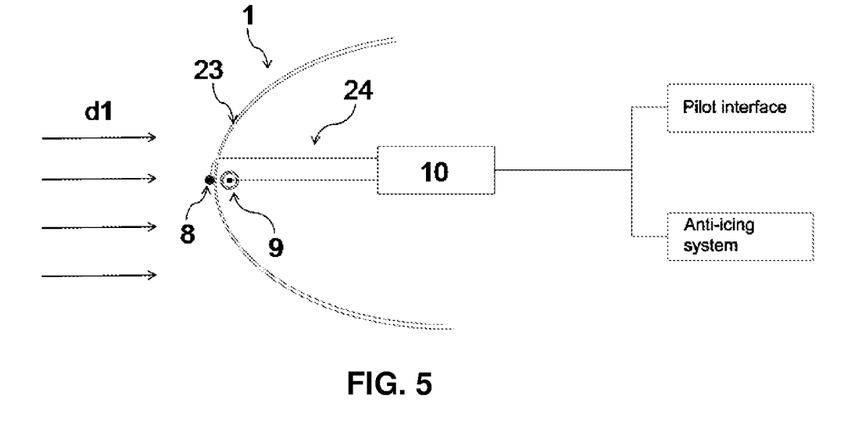
FIG. 5 shows a schematic view of a preferred embodiment of the invention where the system for detecting ice formation is located in an aircraft wing.

FIG. 5 shows a similar embodiment, but in this case, in the wing 1 of an aircraft. This wing 1 comprises a leading edge 23 where an air stream impinges in a direction d1. The wing comprises an inner volume 24.

In this embodiment, the first detector 8 is located in contact with the leading edge 23 of the wing 1, but outside the inner volume 24. The second detector 9 is located inside the volume 24, downstream the first detector 8.

Both optic fibre detectors 8, 9 are connected to the electro-optic module 10, which transfers the measurements and alerts to a pilot of the aircraft in order to, if necessary, activate anti-icing systems. In this preferred embodiment of the invention, when the supercooled water hits and freezes over the first optic fibre detector 8, a temperature difference of several degrees between the first and the second optic fibre detector 8, 9 is detected, and therefore the system will generate an alarm signal. On the other hand, when passing through a warm bubble air, both optic fibre detectors 8, 9 will detect a substantially similar temperature, avoiding possible false alarms by the system.

In another preferred embodiments of the invention, this ice detection system is used in the fuselage of an aircraft, in a blade of a wind turbine or in electric transport wires.

Figure 6:
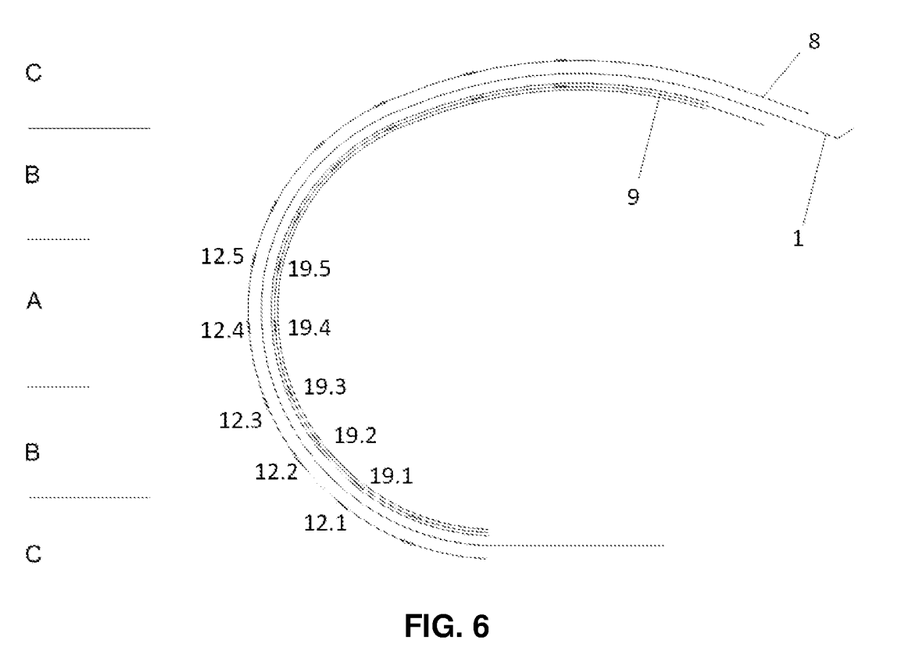
FIG. 6 shows a schematic view of a preferred embodiment of the invention, where each detector comprises a plurality of sensors.

FIG. 6 shows another preferred embodiment of the invention.

In this embodiment, the first detector 8 is also located in contact with the leading edge 23 of the wing 1, but outside the inner volume 24. The second detector 9 is also located inside the volume 24, downstream the first detector 8.

However, the difference is that in this case, the first detector 8 is arranged along the leading edge 23, covering it completely, and comprises a plurality of sensors 12.1, 12.2, 12.3, 12.4, 12.5. These sensors are also distributed along the leading edge, each one being located at different chord line values of the aerodynamic surface.

Each one of the sensors of the first detector has a counterpart in the second detector 9, where each sensor 19.1, 19.2, 19.3, 19.4, 19.5 is associated to one of the sensors of the first detector.

With this arrangement, it is possible to distinguish between different types of ice that are related to the drop size of the super cooled water that provokes the ice formation. The more extended is the impingement zone, the bigger the drops are. Small drops of about 10 to 20 microns in diameter deposit normally only in the nose tip of the profile in zone A, while intermediate drops deposit in zones A and B. Finally, big drops of about 100 microns and bigger deposit all along the chord of the entire profile in zones A, B and C. These icing conditions with super large droplets of equal or bigger size than 100 microns are very critical for the aviation, because they are accreting also in zones of the wing or control surfaces that are out of the areas that are typically ice protected with mechanical/pneumatical bumpers or heating elements. Whilst aircraft that are ice protected with these safety devices are able to fly certain time in normal icing conditions with small droplets, the pilot needs to escape as fast as possible from zones with super large droplets occurrence.

If small super cooled droplets are involved in the ice accretion, the optical fibre sensors in the nose tip (12.4, 12.5 and the corresponding inner sensors 19.4 and 19.5) will detect it, whilst the other sensors along the chord will not detect any ice accretion. If super large droplets form the ice, all the sensors along the chord (12.1 to 12.5 and 19.1 to 19.5) will detect the ice formation.

For droplets in between these both extremes, less of the sensor elements detect the ice accretion. By analysing which of the sensor pairs of outer and inner sensors have received a temperature increment, the droplet size causing the ice accretion may be identified. As in the other embodiments, the sensors of the first detector (12.1 to 12.5) will be in more direct contact with the air stream and the ice accretion and will react much faster than the sensors of the second detector (19.1 to 19.5), which are shielded by the wing 1 itself and a tubing where they are inside. These sensors can be installed in one or in several positions of the wing or control surface structure to have redundancy in the monitoring of ice events.

In another preferred embodiment of the invention, the electro-optic module 10 comprises an optical interrogator.

By means of the present invention, the formation and accretion of ice on a body 1 is allowed to be measured quickly and accurately. Another advantage of said detection system is that it is based on optical measurements so it does not electromagnetically interfere with the environment and is not interfered by it.

The invention claimed is:

1. A system for detecting ice formation on a body comprising at least:
   a first detector comprising a first temperature sensor;
   a second detector comprising a second temperature sensor; and
   an electro-optic module configured to generate input measuring signals into the first and second detectors to receive measuring signals from the first and second detectors and to process and transmit measurements;
   the system being characterized in that:
   the first detector comprises a first housing surrounding the first temperature sensor defining a first detection volume formed between the first temperature sensor and the first housing, the first detection volume being filled by a fluid, such as air;
   the second detector comprises a second housing surrounding the second temperature sensor defining a second detection volume formed between the second temperature sensor and the second housing, the second detection volume being filled by a fluid, such as air; and in that
   the second detection volume is greater than the first detection volume.

2. The system according to claim 1 wherein the at least one first detector is a first optic fibre detector wherein:

the first optic fibre detector comprises a first optical fibre core;

the first temperature sensor is arranged into the first optical fibre core, the first temperature sensor being a first optical sensor;

the first optic fibre detector comprises a first glass cladding having a first outer diameter, the first glass cladding being arranged around the first optical fibre core in such a way that a first portion of the first glass cladding surrounds the first optical sensor;

the first housing is a first sealed capillary having a second inner diameter, the first sealed capillary being disposed at least around the first portion of the first glass cladding, wherein the second inner diameter is greater than the first outer diameter, and the first detection volume corresponds to the volume between the first outer diameter and the second inner diameter;

wherein the at least one second detector is a second optic fibre detector wherein:

the second optic fibre detector comprises a second optical fibre core;

the second temperature sensor is arranged into the second optical fibre core, the second temperature sensor being a second optical sensor;

the second optic fibre detector comprises a second glass cladding having a third outer diameter, the second glass cladding being arranged around the second optical fibre core;

the second housing is a second sealed capillary, this second sealed capillary having a fourth inner diameter, the second sealed capillary being disposed around the second glass cladding, the fourth inner diameter being greater than the third outer diameter and the second detection volume corresponds to the volume between the third outer diameter and the fourth inner diameter, wherein the difference between the fourth inner diameter and the third outer diameter is greater than the difference between the second inner diameter and the first outer diameter;

and wherein the electro-optic module is configured to generate light inputs and to receive optical measurements from the first and second optic fibre detectors and also configured to process and transmit the optical measurements.

3. The system according to claim 2, wherein the first detector and the second detector comprise a plurality of optic fibre sensors, each optic fibre sensor comprising a fibre Bragg grating or a long-period fibre grating.

4. The system according to claim 2, wherein the first outer diameter and the third outer diameter are comprised between 0.006 and 0.1265 mm, wherein the second inner diameter is comprised between 0.13 and 0.25 mm and wherein the fourth inner diameter is comprised between 0.5 and 1.0 mm.

5. The system according to claim 2, wherein the first capillary of the at least one first optic fibre detector comprises a fifth outer diameter comprised between 0.25 and 0.5 mm and wherein the second capillary sealed of the at least one second optic fibre detector comprises a sixth outer diameter comprised between 2 and 3 mm.

6. The system according to claim 2, wherein the first and second optical sensors have a length comprised between 2 and 20 mm.

7. The system according to claim 2, wherein the at least one first optic fibre detector comprises:

a first protective coating around a second portion of the first glass cladding, in such a way that the second portion of the first glass cladding is coated by the first protective coating and a third portion of the first glass cladding is not coated, the first portion being substantially in the middle of the third portion and the first sealed capillary being around the third portion, a connecting element between the first protective coating and the first sealed capillary;

and wherein the at least one second optic fibre detector comprises a second protective coating around the second glass cladding.

8. The system according to claim 7, wherein the third portion extends along a length comprised between 20 and 50 mm, and the first sealed capillary extends along a length comprised between 30 and 60 mm.

9. The system according to claim 7, wherein the connecting element between the first protective coating and the first sealed capillary of the at least one first optic fibre detector comprises a probe or an adhesive, or a combination of both.

10. The system according to claim 2, wherein the first sealed capillary comprises a metallic material and the second sealed capillary comprises glass or a polymer.

11. The system according to claim 1, further comprising an aerodynamic surface with a leading edge intended to receive an air stream and a volume downstream the leading edge, wherein the first detector is located in contact with the leading edge of the aerodynamic surface and the second detector is located in the volume, downstream the first detector.

12. The system according to claim 11, wherein the first detector is arranged covering at least a portion of the leading edge and comprises a plurality of sensors, at least two sensors being located at different chord line values of the aerodynamic surface.

13. A method for detecting ice formation on a body by a system according to claim 1, the method being characterized in that it comprises the following steps:

generating an input signal into the first and second detectors;

generating an output signal by the first and second temperature sensors;

receiving the output signal in the electro-optic module;

processing the received output signal and calculating a temperature difference;

generating a warning signal if the temperature difference is greater than a predetermined temperature threshold.

14. The method according to claim 13, comprising the following steps:

injecting a light beam in each of the first and second optic fibre detectors;

respectively filtering the light beams in the at least first and second optical sensors as a function of the temperature of the respective optical sensor;

receiving the respective filtered light beams in the electro-optic module;

processing the received light beams and calculating a temperature difference;

generating a warning signal if the temperature difference is greater than a predetermined temperature threshold.

15. The method according to claim 14, wherein prior to the step of injecting a light beam, the method further comprising the steps of:

providing a body where ice formation is to be detected, the body comprising an outer surface intended to receive an air stream and a volume downstream this outer surface arranged to be protected from the air stream;

placing the at least one first optic fibre detector in contact with the outer surface of the body and placing the at least one second optic fibre detector in the volume behind the outer surface.

16. The method according to claim 13, wherein
the step of processing the receiving output signal further comprises calculating the derivative of the temperature with respect to time, and
the step of generating a warning signal comprises generating one of a predetermined group of warning signals, depending on the result of the derivative of the temperature with respect to time.

17. Use of the method according to claim 13 for detecting ice in any one of the following bodies: a part of an aircraft or of a wind turbine or an electrical power transmission line.

* * * * *